(12) United States Patent
Qin et al.

(10) Patent No.: US 9,402,355 B2
(45) Date of Patent: Aug. 2, 2016

(54) SPRAY BOOM DESIGN

(71) Applicant: Dow AgroSciences LLC, Indianapolis, IN (US)

(72) Inventors: Kuide Qin, Carmel, IN (US); Dylan Engels, Indianapolis, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 182 days.

(21) Appl. No.: 14/204,863

(22) Filed: Mar. 11, 2014

(65) Prior Publication Data

US 2014/0263731 A1    Sep. 18, 2014

Related U.S. Application Data

(60) Provisional application No. 61/783,136, filed on Mar. 14, 2013.

(51) Int. Cl.
*A01G 25/09*    (2006.01)

(52) U.S. Cl.
CPC ..................... *A01G 25/09* (2013.01)

(58) Field of Classification Search
CPC ..................................................... A01G 25/09
USPC ......... 239/156, 146, 147, 161, 162, 163, 164, 239/165, 166, 167, 159, 722, 723, 726, 727

See application file for complete search history.

(56) References Cited

U.S. PATENT DOCUMENTS

| | | | | |
|---|---|---|---|---|
| 1,887,092 A | * | 11/1932 | Glase | A01M 7/005 239/168 |
| 4,518,118 A | * | 5/1985 | Takata | A01M 7/0089 239/163 |
| 5,248,090 A | | 9/1993 | Williamson | |
| 5,516,044 A | * | 5/1996 | Thorstensson | A01M 7/0042 239/159 |
| 6,116,519 A | | 9/2000 | Williamson | |
| 2007/0138315 A1 | * | 6/2007 | Earle | A01C 23/008 239/146 |
| 2012/0132730 A1 | * | 5/2012 | Peterson | A01G 25/09 239/738 |
| 2014/0263705 A1 | * | 9/2014 | Michael | A01G 25/16 239/10 |
| 2014/0284400 A1 | * | 9/2014 | Hebbert | A01M 7/0092 239/159 |

FOREIGN PATENT DOCUMENTS

GB    2259637 A    3/1993

\* cited by examiner

*Primary Examiner* — Justin Jonaitis
(74) *Attorney, Agent, or Firm* — C. W. Arnett; Faegre Baker Daniels LLP

(57) ABSTRACT

A spray boom system is disclosed that provides substantially equal solution paths to a plurality of nozzles.

26 Claims, 3 Drawing Sheets

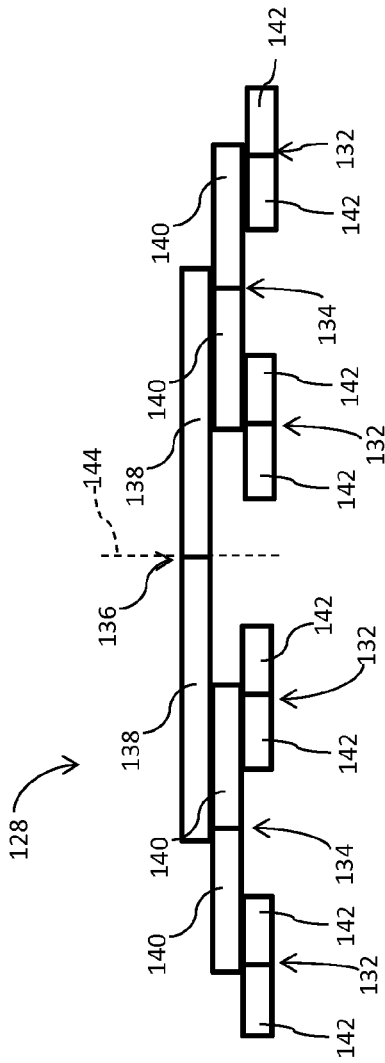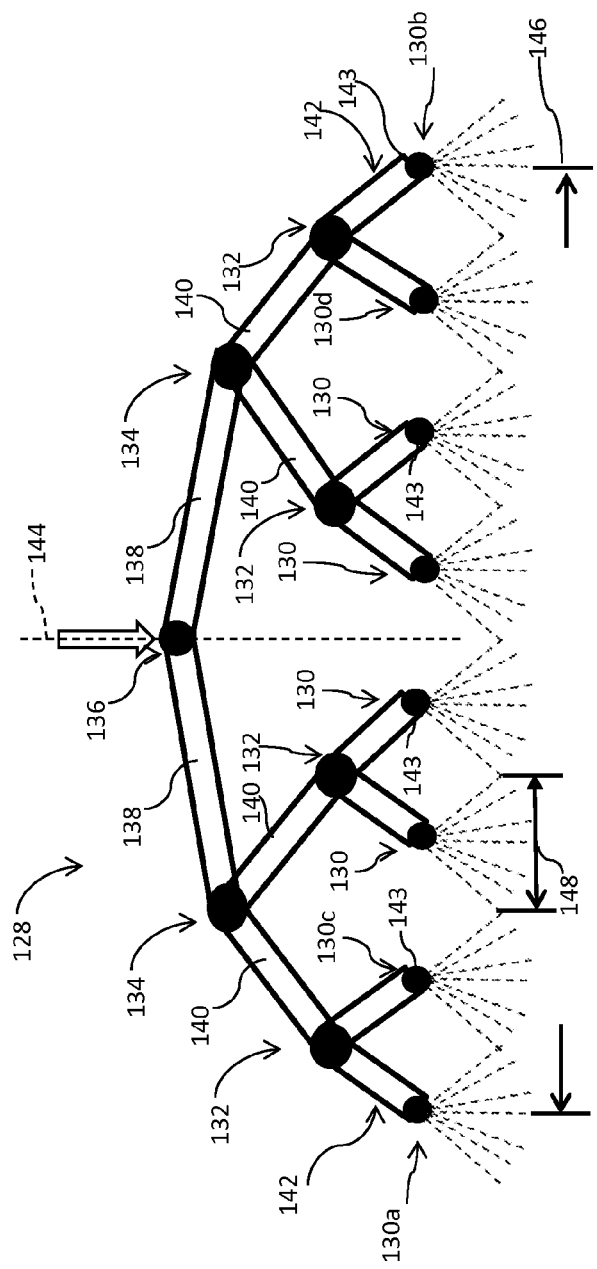

SPRAY BOOM DESIGN

FIELD

The present disclosure relates to spray boom design for distributing agricultural solutions containing agriculturally active ingredients to vegetation and in particular to structures for delivering pressurized fluid to a plurality of nozzles.

BACKGROUND

Spray booms are configured to distribute agriculturally active ingredients to vegetation. Spray booms often include tanks to store a solution containing the agriculturally active ingredients, a pump to pressurize the solution, and conduits to deliver the solution to a plurality of nozzles of the system.

In the prior art, pressurized agriculturally active solutions travel from upstream conduits to downstream conduits at non-terminal locations in the upstream conduits. This causes differences in the pressure drops from the pump to the nozzles, and also causes residue to build up in the closed terminal ends of upstream conduits. In a system where a solution only travels from upstream conduits to downstream conduits via terminal ends, solids build-up in closed terminal ends is prevented.

SUMMARY

According to the present disclosure, a spray boom system is provided that is configured to apply agriculturally active ingredients. The spray boom system includes a frame having a longitudinal axis and a plurality of nozzles supported by the frame and configured to distribute agriculturally active ingredients. The plurality of nozzles includes a right-most nozzle and a left-most nozzle. The right-most nozzle and the left-most nozzle are separated by a lateral distance. The system further includes a pressure source configured to pressurize a solution containing the agriculturally active ingredient, a tank configured to store at least a portion of the solution, and a plurality of conduits positioned to direct the pressurized solution along a plurality of solution paths to the plurality of nozzles. The plurality of solution paths have a lateral component. A sum of the lateral components of the plurality of solution paths defines a lateral sum. A ratio of the lateral sum to the lateral distance is equal to or greater than 1.5.

According to another aspect of the present disclosure, a spray boom system is provided that is configured to apply agriculturally active ingredients. The spray boom system includes a frame having a longitudinal axis, at least three nozzles supported by the frame and configured to distribute agriculturally active ingredients, a pressure source configured to pressurize a solution containing the agriculturally active ingredient, a tank configured to store at least a portion of the solution, and a plurality of conduits positioned to direct the pressurized solution along a plurality of solution paths to the at least three nozzles. A distance that the solution travels from the pressure source to each of the at least three nozzles along the plurality of conduits is substantially equal.

According to another aspect of the present disclosure, a spray boom system is provided that is configured to apply agriculturally active ingredients. The spray boom system includes a frame having a longitudinal axis, a plurality of nozzles supported by the frame and configured to distribute agriculturally active ingredients, a pressure source configured to pressurize a solution containing the agriculturally active ingredient, a tank configured to store at least a portion of the solution, and a plurality of conduits positioned to direct the pressurized solution along a plurality of solution paths to the plurality of nozzles. The plurality of conduits includes a plurality of downstream junctions that divides the solution for delivery to at least a laterally inward nozzle and a laterally outward nozzle of the plurality of nozzles. The plurality of conduits further includes a plurality of upstream junctions that divides the solution for delivery to the plurality of downstream junctions. The laterally inward nozzles are positioned laterally inward of the respective downstream junctions delivering solution to the laterally inward nozzles. The laterally outward nozzles are positioned laterally outward of the respective downstream junctions delivering solution to the laterally outward nozzles.

According to another aspect of the present disclosure, a spray boom system configured for the application of an agricultural solution containing agriculturally active ingredients is provided. The spray boom system includes a frame having a longitudinal axis, a plurality of nozzles supported by the frame and configured to distribute agriculturally active ingredients, a pressure source configured to pressurize a solution containing the agriculturally active ingredient, a tank configured to store at least a portion of the solution, and a plurality of conduits. The plurality of conduits are positioned to direct the pressurized solution along a plurality of solution paths to the plurality of nozzles, the pressurized solution traveling from upstream conduits to downstream conduits only via terminal ends of the upstream conduits.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which:

FIG. 5 is another diagrammatic top plan view of conduits of the spray boom system of FIG. 1, wherein all of the conduits are of substantially the same cross-sectional diameter; and FIG. 6 is a front elevational view of the conduits of FIG. 5 showing a plurality of nozzles spraying agriculturally active ingredient supplied through the conduits, wherein all of the conduits are of substantially the same cross-sectional diameter.

Corresponding reference characters indicate corresponding parts throughout the several views.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
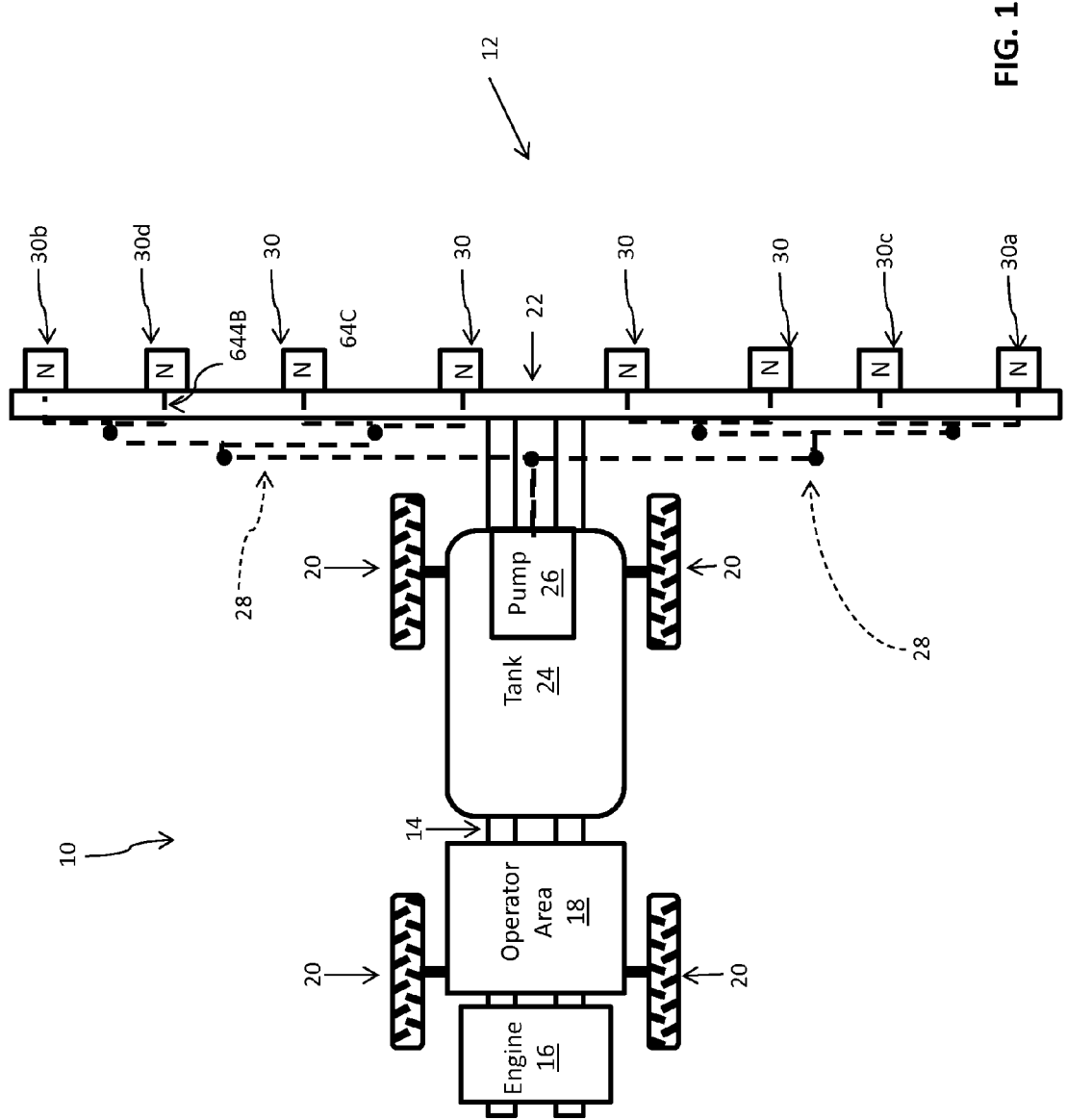
FIG. 1 is a diagrammatic top plan view of a vehicle, such as a tractor, with a spray boom system configured to distribute agriculturally active ingredients onto vegetation.

Referring to FIG. 1, a vehicle 10, such as a tractor, and an exemplary spray boom system 12 is shown. Vehicle 10 includes a chassis 14, an engine 16 supported by chassis 14, an operator area 18 supported by chassis 14, and a plurality of ground engaging member 20, such as tires, tracks, etc.

Figure 3:
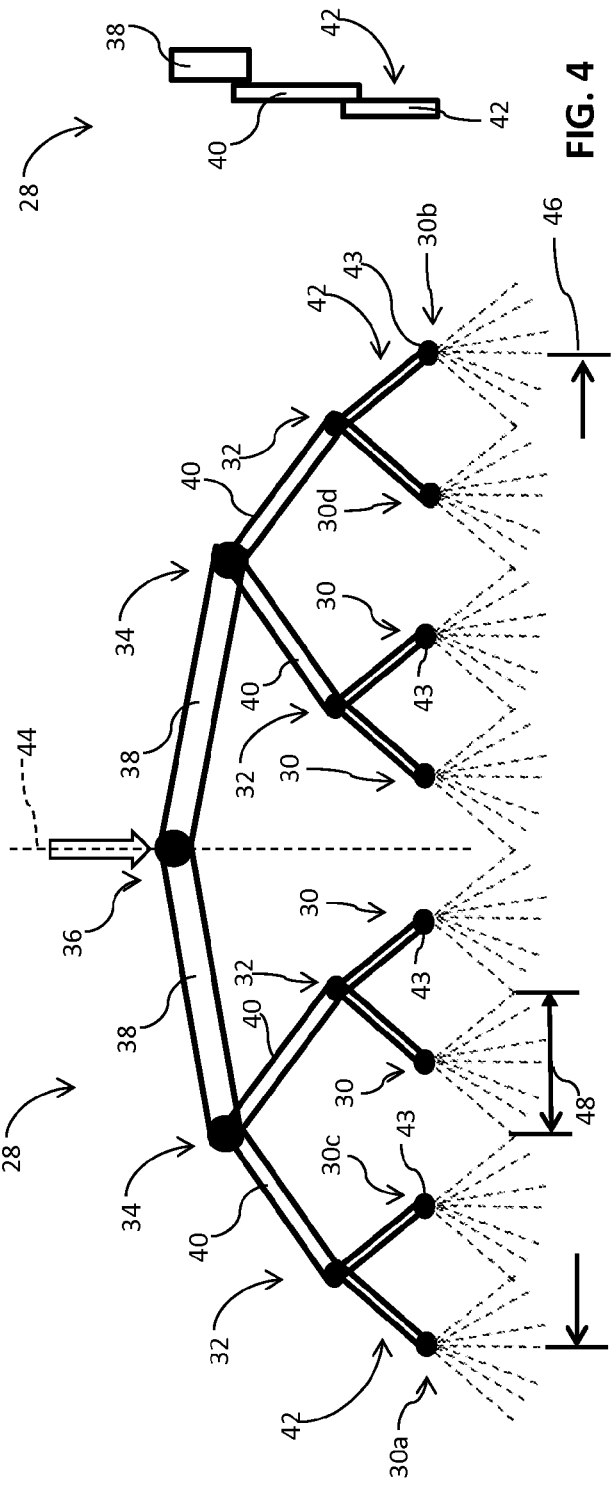
FIG. 3 is front elevational view of the conduits of FIG. 2 showing a plurality of nozzles spraying agriculturally active ingredient supplied through the conduits.

Spray boom system 12 includes a frame 22 supported by chassis 14 of vehicle 10, a tank 24 supported by chassis 14, a pressure source, such as pump 26, a plurality of conduits 28, and a plurality of nozzles 30, shown in FIG. 3. In the illustrated embodiment, all of spray boom system 12 is supported by vehicle 10. According to alternative embodiments of the present disclosure, all or several of the components of spray boom system 12 may be supported by a trailer (not shown) that is pulled by vehicle 10. Such a trailer is illustrated in U.S. Pat. No. 5,248,909, to Williamson, the entire disclosure of which is expressly incorporated by reference herein.

As shown in FIG. 3, conduits 28 include a plurality of tubes and junctions that distribute a solution that contains one or more agriculturally active ingredients stored in tank 24 to nozzles 30. Pump 26 pulls the solution from tank 24 and pressurizes the solution for delivery to conduits 28. Typically, the applied agricultural solution contains water or other liquid and one and more dissolved agriculturally active ingredients, such as herbicides, pesticides, fungicides, fertilizers, etc. Such agricultural solutions could be applied pre-emergence or post-emergence relative to a planted crop, or could be applied before the planting of a crop.

Conduits 28 define a plurality of solution paths between pump 26 and each of nozzles 30 through which the solution travels before being sprayed on the vegetation. The solution travels a distance along these solution paths to each of nozzles 30. According to the preferred embodiment of the present disclosure, the distance the solution travels to each of the plurality of solution paths is substantially equal. Because the solution paths are of substantially the same length, the pressure drop due to frictional losses is also substantially equal. As a result, the pressure of the solution provided at each of nozzles 30 is also substantially equal.

Figure 4:
FIG. 4 is a side elevational view of the conduits of FIG. 2.

Conduits 28 include downstream junctions 32 that divide the solution for delivery to nozzles 30. Similarly, conduits 28 include upstream junctions 34 that divide the solution for delivery to downstream junctions 32 and at least one further upstream junction 36 that divides the solution received from pump 26 for delivery to junctions 34, which are downstream junctions relative to junctions 36. Conduits 28 include largest tubes 38 that communicate the solution from junction 36 to junction 34, medium tubes 40 that communicate the solution from upstream junctions 34 to downstream junctions 32, and smallest tubes 42 that communicate solution from junctions 32 to respective nozzles 30. According to the preferred embodiment of the present disclosure, the diameter or interior cross section of the tubes decreases from largest tubes 38 to medium tubes 40 to smallest tubes 42. According to alternative embodiments of the present disclosure, the tubes are the same size. As shown in FIG. 4, nozzles 30 are positioned at downstream terminal ends 43 of smallest tubes 42. By placing nozzles 30 at the terminal ends 43, ingredients and other materials are less likely to collect and potentially clog nozzles 30.

Figure 2:
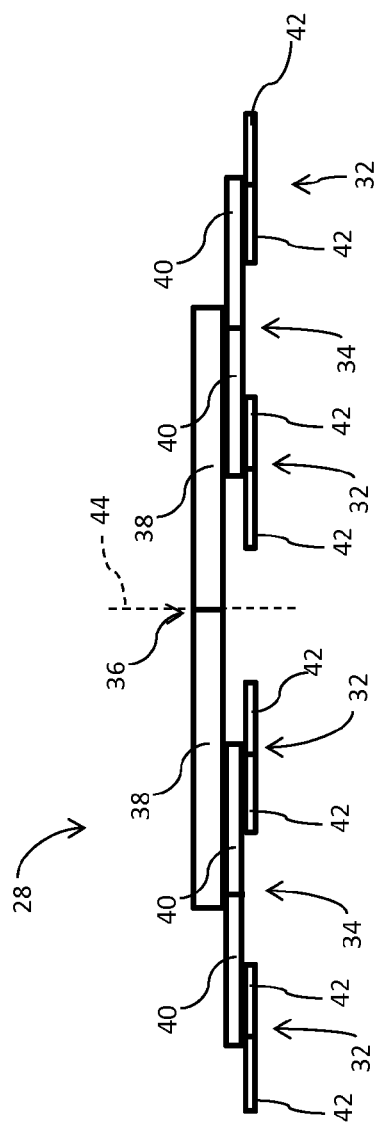
FIG. 2 is another diagrammatic top plan view of conduits of the spray boom system of FIG. 1.

As shown in FIGS. 2 and 3, at each junction 32, 34, 36, the solution is divided so that a portions of the solutions travel in opposite lateral directions. In the context of the present application, the term "lateral" means a lateral to a longitudinal axis 44 in a horizontal direction. In addition to moving in a lateral direction, the fluid may move vertically, forward, and/or backward. For example, in tubes 38, the solution moves laterally outward and vertically downward, as shown in FIG. 3, and in junctions 34, the fluid moves backwards, as shown in FIG. 2.

At each junction 32, 34, 36, the solution diverts to move in opposite lateral directions. At junction 36, a portion of the solution moves to the right in a laterally outward direction and portion of the solution move to the left in a laterally outward direction. At each of junctions 34, portions of the solution move laterally inward and portions move laterally outward. Similarly, at each of junctions 32, portions of the solution move laterally inward and portions of the solution move laterally outward on the way to nozzles 30. For each of the two laterally outward-most nozzles 30 (a left-most nozzle 30a and a right-most nozzle 30b), the solution only travels laterally outward on its solution path from junction 36 to the respective laterally outward-most nozzles 30a, 30b. For each of the two laterally inward-most nozzles (nozzles 30c, 30d adjacent to longitudinal axis 44), the solution travels laterally outward until it reaches either of junctions 34 and then laterally inward for the remainder of its travel on its solution path to the respective laterally inward-most nozzles 30.

Right-most nozzle 30a and right most nozzle 30b are separated by a lateral distance 46. Because of the lateral inward and outward solutions paths, the sum of the lateral movement of the solution delivered to nozzles 30 is greater than lateral distance 46. For example, the solution path to laterally inward-most nozzle 30c includes lateral components (outward and inward) that are half lateral distance 46. Similarly, the solution paths to the other nozzles 30 include lateral components (outward and inward) that are half lateral distance 46.

According to the preferred embodiment of the present disclosure, lateral distance 46 is equal to about seven times a spray width 48 of nozzles 30, which is also the distance between adjacent nozzles 30.

In other embodiments, where the actual physical spray patterns of the nozzles 30 overlap, or are narrower than the width 48 in the preferred embodiment, the spray width is still defined as an ideal spray width, or the distance between the adjacent nozzles 30. This ideal spray width is the distance used to calculate a ratio of the lateral sum to lateral distance.

The lateral component of the solution path defined by each of largest tubes 38 is about twice spray width 48. The lateral component of the solution path defined by each of medium tubes 40 is about equal to spray width 48. The lateral component of the solution path defined by each of the smallest tubes 42 is equal to about one half of spray width 48. In total as a lateral sum, these lateral components of the solution paths equal about twelve times the spray width of nozzles 30. As such, a ratio of this lateral sum to lateral distance 46 is about 12/7 or about 1.7.

Depending on the number of nozzles 30, junctions 32, 34, 36, and other components of conduits 28, this ratio may be greater or smaller. For example, in a system twice as wide as system 12 with sixteen nozzles 30 and another level of junctions, the ratio is about 40/15 or about 2.7. In a system four times as wide as system 12 with thirty two nozzles 30 and two additional levels of junctions, the ratio is about 144/31 or about 4.6. Smaller ratios, such as 1.3, 1.4, 1.5, or 1.65 may also be provided. Similarly larger ratios, such as 2.0, 2.4, 2.8, 3.0, 3.4, 3.6 or greater may also be provided. According to the present disclosure, two tubes are downstream of each junction. According to alternative embodiments, more tubes may be provided downstream of each junction, preferably of substantially equal length to provide substantially equal pressure drops. As such, systems with odd numbers of nozzles 30 may be provided. Similarly, systems with even numbers of nozzles 30 may be provided in addition to system 12 with eight nozzles 30 and the sixteen and thirty two nozzle systems described above.

For most of nozzles 30, the lateral distance that the solution travels is substantially greater than the nozzles lateral distance from longitudinal axis 44. As mentioned above, the solution's lateral travel to reach each nozzle 30 is about half of lateral distance 46 between outward-most nozzles 30a, 30b or about 3.5 times spray width 48 of nozzles 30. According to one embodiment of the present disclosure, inward-most nozzles 30c, 30d are laterally spaced about one half of spray width 48 from longitudinal axis 44. As such, the lateral distance the solution travels from pump 26 to nozzles 30c, 30d is about seven times (3.5/0.5) the lateral distance of nozzles 30c, 30d from longitudinal axis 44

Each of junctions 32, 34, 36 is laterally positioned in the middle of at least two nozzles 30. For example, downstream junctions 32 are middle junctions that are positioned laterally between a laterally outward nozzle 30 that each downstream junction 32 supplies and a laterally inward nozzle 30 that each downstream junction 32 also supplies. Similarly, upstream junctions 34 are middle junctions that are positioned laterally between two outward nozzles 30 that each upstream junction 34 supplies and two laterally inward nozzles 30 that each upstream junction 34 also supplies. Finally, nozzle 36 is a middle junction that is laterally positioned between four right side nozzles 30 that it supplies and four left side nozzles 30 that it also supplies.

Referring now to FIG. 5, a diagrammatic top plan view of conduits of a spray boom system of FIG. 6 is shown, wherein all of the conduits are of substantially the same cross-sectional diameter.

Referring now to FIG. 6, conduits 128 define a plurality of solution paths between pump 26 and each of nozzles 130 through which the solution travels before being sprayed on the vegetation. The solution travels a distance along these solution paths to each of nozzles 130. According to the preferred embodiment of the present disclosure, the distance the solution travels to each of the plurality of solution paths is substantially equal. Because the solution paths are of substantially the same length, the pressure drops due to frictional losses are also substantially equal. As a result, the pressure of the solution provided at each of nozzles 130 is also substantially equal.

Conduits 128 include downstream junctions 132 that divide the solution for delivery to nozzles 130. Similarly, conduits 128 include upstream junctions 134 that divide the solution for delivery to downstream junctions 132 and at least one further upstream junction 136 that divides the solution received from pump 126 for delivery to junctions 134, which are downstream junctions relative to junctions 136. In the embodiment shown by FIG. 6, conduits 128 include tubes 138 that communicate the solution from junction 136 to junction 134, substantially the same size tubes 140 that communicate the solution from upstream junctions 134 to downstream junctions 132, and substantially the same size tubes 142 that communicate solution from junctions 132 to respective nozzles 130. According to one embodiment of the present disclosure, the diameter or interior cross section of the tubes does not decrease as the solution travels through the solution paths. According to alternative embodiments of the present disclosure, the tubes decrease in size as the solution travels along the solution path. As shown in FIG. 6, nozzles 130 are positioned at downstream terminal ends 143 of tubes 142. By placing nozzles 130 at the terminal ends 143, ingredients and other materials are less likely to collect and potentially clog nozzles 130.

As shown in FIG. 6, the pressurized solution would travel from upstream conduits to downstream conduits only via terminal ends of the upstream conduits. For example, a pressurized solution in tubes 138 would only travel into tubes 140 via the terminal ends of tubes 138 at junctions 134. Similarly, the pressurized solution in tubes 140 would only travel into tubes 142 via the terminal ends of tubes 140 at junctions 132. Such an arrangement prevents any solids build-up in closed terminal ends, which lack constant flow through the end of the tube. However, in other embodiments, the pressurized solution could flow from upstream conduits to downstream conduits at non-terminal ends while maintaining solution paths which are substantially equal.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A spray boom system configured for the application of an agricultural solution containing agriculturally active ingredients, the spray boom system including
    a frame having a longitudinal axis,
    a plurality of nozzles supported by the frame and configured to distribute agriculturally active ingredients, the plurality of nozzles including a right-most nozzle and a left-most nozzle, the right-most nozzle and the left-most nozzle being separated by a lateral distance,
    a pressure source configured to pressurize a solution containing the agriculturally active ingredient,
    a tank configured to store at least a portion of the solution, and
    a plurality of conduits positioned to direct the pressurized solution along a plurality of solution paths to the plurality of nozzles, each of the plurality of conduits directing the pressurized solution downward and the plurality of solution paths having a lateral component, a sum of the lateral components of the plurality of solution paths defining a lateral sum, a ratio of the lateral sum to the lateral distance being equal to or greater than 1.5,
    wherein the plurality of conduits includes a plurality of middle junctions that divides the solution for delivery to at least a laterally inward nozzle and a laterally outward nozzle of the plurality of nozzles, the laterally inward nozzles are positioned laterally inward of the respective middle junctions delivering solution to the laterally inward nozzles, the laterally outward nozzles are positioned laterally outward of the respective middle junctions delivering solution to the laterally outward nozzles.

2. The spray boom system of claim 1, wherein the ratio is greater than 1.65.

3. The spray boom system of claim 2, wherein the ratio is greater than 2.0.

4. The spray boom system of claim 3, wherein the ratio is greater than 2.4.

5. The spray boom system of claim 1, wherein the solution provided to the plurality of nozzles experiences a pressure drop caused by frictional losses between the pressure source and the plurality of nozzles, the pressure drop to the plurality of nozzles being substantially equal.

6. The spray boom system of claim 1, wherein the plurality of middle junctions includes at least one upstream middle junction and a plurality of downstream middle junctions receiving solution from the upstream middle junction.

7. The spray boom system of claim 1, wherein the lateral components of a plurality of the solution paths includes laterally inward and lateral inward components.

8. A spray boom system configured for the application of an agricultural solution containing agriculturally active ingredients, the spray boom system including
- a frame having a longitudinal axis,
- at least three nozzles supported by the frame and configured to distribute agriculturally active ingredients,
- a pressure source configured to pressurize a solution containing the agriculturally active ingredient,
- a tank configured to store at least a portion of the solution, and
- a plurality of conduits positioned to direct the pressurized solution along a plurality of solution paths to the at least three nozzles, a distance that the solution travels from the pressure source to each of the at least three nozzles along the plurality of conduits being substantially equal, wherein each of the plurality of conduits directs the solution downward,
- wherein the plurality of conduits include a plurality of middle junctions that divides the solution for delivery to at least a laterally inward nozzle and a laterally outward nozzle of the at least three nozzles, the laterally inward nozzles are positioned laterally inward of the respective middle junctions delivering solution to the laterally inward nozzles, the laterally outward nozzles are positioned laterally outward of the respective middle junctions delivering solution to the laterally outward nozzles.

9. The spray boom system of claim 8, wherein the solution provided to the at least three nozzles experiences a pressure drop caused by frictional losses between the pressure source and the at least three nozzles, the pressure drop to each of the at least three nozzles being substantially equal.

10. The spray boom system of claim 8, wherein the at least three nozzles includes at least one laterally inward-most nozzle, the distance that the solution travels from the pressure source to the laterally inward-most nozzle includes a lateral component that is substantially greater than a lateral distance of the inward-most nozzle to the longitudinal axis of the frame.

11. The spray boom system of claim 8, wherein the at least three nozzles includes at least one inward-most nozzle and at least one outward-most nozzle and the distance that the solution travels from the pressure source to inward-most nozzle is substantially equal to the distance that the solution travels from the pressure source to outward-most nozzle.

12. The spray boom system of claim 9, wherein the at least three nozzles includes at least eight nozzles and a distance that the solution travels from the pressure source to each of the at least eight nozzles along the plurality of conduits is substantially equal.

13. A spray boom system configured for the application of an agricultural solution containing agriculturally active ingredients, the spray boom system including
- a frame having a longitudinal axis,
- a plurality of nozzles supported by the frame and configured to distribute agriculturally active ingredients,
- a pressure source configured to pressurize a solution containing the agriculturally active ingredient,
- a tank configured to store at least a portion of the solution, and
- a plurality of conduits positioned to direct the pressurized solution along a plurality of solution paths to the plurality of nozzles, each of the plurality of conduits directing the pressurized solution downward and the plurality of conduits including a plurality of downstream junctions that divides the solution for delivery to at least a laterally inward nozzle and a laterally outward nozzle of the plurality of nozzles, the plurality of conduits further includes a plurality of upstream junctions that divides the solution for delivery to the plurality of downstream junctions, the laterally inward nozzles being positioned laterally inward of the respective downstream junctions delivering solution to the laterally inward nozzles, the laterally outward nozzles being positioned laterally outward of the respective downstream junctions delivering solution to the laterally outward nozzles.

14. The spray boom system of claim 13, wherein laterally inward nozzles and laterally outward nozzles receiving solution through the same downstream junction are spaced apart by a distance greater than half the spray pattern width of at least one of said laterally inward nozzle and said laterally outward nozzle.

15. The spray boom system of claim 13, wherein a distance from the plurality of upstream junctions to the nozzles receiving solution from the upstream junctions is substantially equal for all of said nozzles.

16. The spray boom system of claim 13, wherein the plurality of conduits further includes at least one further upstream junction that divides the solution for delivery to the plurality of downstream junctions.

17. The spray boom system of claim 15, wherein a distance from the at least one further upstream junction to the nozzles receiving solution from the further upstream junctions is substantially equal for all of said nozzles.

18. The spray boom system of claim 13, wherein the solution provided to the plurality of nozzles experiences a pressure drop caused by frictional losses between the pressure source and the plurality of nozzles, the pressure drop to each of the plurality of nozzles being substantially equal.

19. The spray boom system of claim 13, wherein a distance between adjacent nozzles of the plurality of nozzles is substantially equal.

20. A spray boom system configured for the application of an agricultural solution containing agriculturally active ingredients, the spray boom system including
- a frame having a longitudinal axis,
- a plurality of nozzles supported by the frame and configured to distribute agriculturally active ingredients, a pressure source configured to pressurize a solution containing the agriculturally active ingredient,
- a tank configured to store at least a portion of the solution, and
- a plurality of conduits, each having a first terminal end and a second terminal end both intersecting a longitudinal axis of the conduit, the plurality of conduits being positioned to direct the pressurized solution along a plurality of solution paths to the plurality of nozzles, the pressurized solution traveling from the second terminal end of upstream conduits to the first terminal end of downstream conduits.

21. The spray boom system of claim 20, wherein laterally inward nozzles and laterally outward nozzles receiving solution through the same downstream junction are spaced apart by a distance greater than half the spray pattern width of at least one of said laterally inward nozzle and said laterally outward nozzle.

22. The spray boom system of claim 20, wherein a distance from the plurality of upstream junctions to the nozzles receiving solution from the upstream junctions is substantially equal for all of said nozzles.

23. The spray boom system of claim 20, wherein the plurality of conduits further includes at least one further upstream junction that divides the solution for delivery to the plurality of downstream junctions.

24. The spray boom system of claim 20, wherein a distance from the at least one further upstream junction to the nozzles receiving solution from the further upstream junctions is substantially equal for all of said nozzles.

25. The spray boom system of claim 20, wherein the solution provided to the plurality of nozzles experiences a pressure drop caused by frictional losses between the pressure source and the plurality of nozzles, the pressure drop to each of the plurality of nozzles being substantially equal.

26. The spray boom system of claim 20, wherein a distance between adjacent nozzles of the plurality of nozzles is substantially equal.

* * * * *